United States Patent [19]

Darwood

[11] 4,066,848
[45] Jan. 3, 1978

[54] TELEPHONE RING DETECTOR CIRCUIT

[75] Inventor: James R. Darwood, Anaheim, Calif.

[73] Assignee: T.A.D., Paramount, Calif.

[21] Appl. No.: 720,682

[22] Filed: Sept. 7, 1976

[51] Int. Cl.² ............................................. H04M 1/00
[52] U.S. Cl. .................................... 179/84 R; 328/136
[58] Field of Search ................. 179/84 R, 84 A, 84 T, 179/2 R, 2 A, 6 R, 84 VF; 324/78 D; 328/136–139

[56] References Cited

U.S. PATENT DOCUMENTS

| | | | |
|---|---|---|---|
| 3,702,904 | 11/1972 | Bard | 179/84 R |
| 3,783,193 | 1/1974 | Lee | 179/2 A |
| 3,979,560 | 9/1976 | Darwood | 179/6 R |

*Primary Examiner*—William C. Cooper
*Assistant Examiner*—Joseph A. Popek
*Attorney, Agent, or Firm*—Keith D. Beecher

[57] ABSTRACT

A telephone ring detector circuit is provided which finds particular utility in telephone answering systems. The detector circuit responds only to ring signals on the telephone line to activate the system, and it is unresponsive to dialing pulses, or other signals, that may be present on the telephone line. The detector circuit of the invention distinguishes the ring signals from the other signals on the telephone line by counting the number of pulses present on the telephone line for the various signals and providing a ring detect output only when the number of pulses is in excess, for example, of the pulses which form the trains of the dialing signal.

7 Claims, 1 Drawing Figure

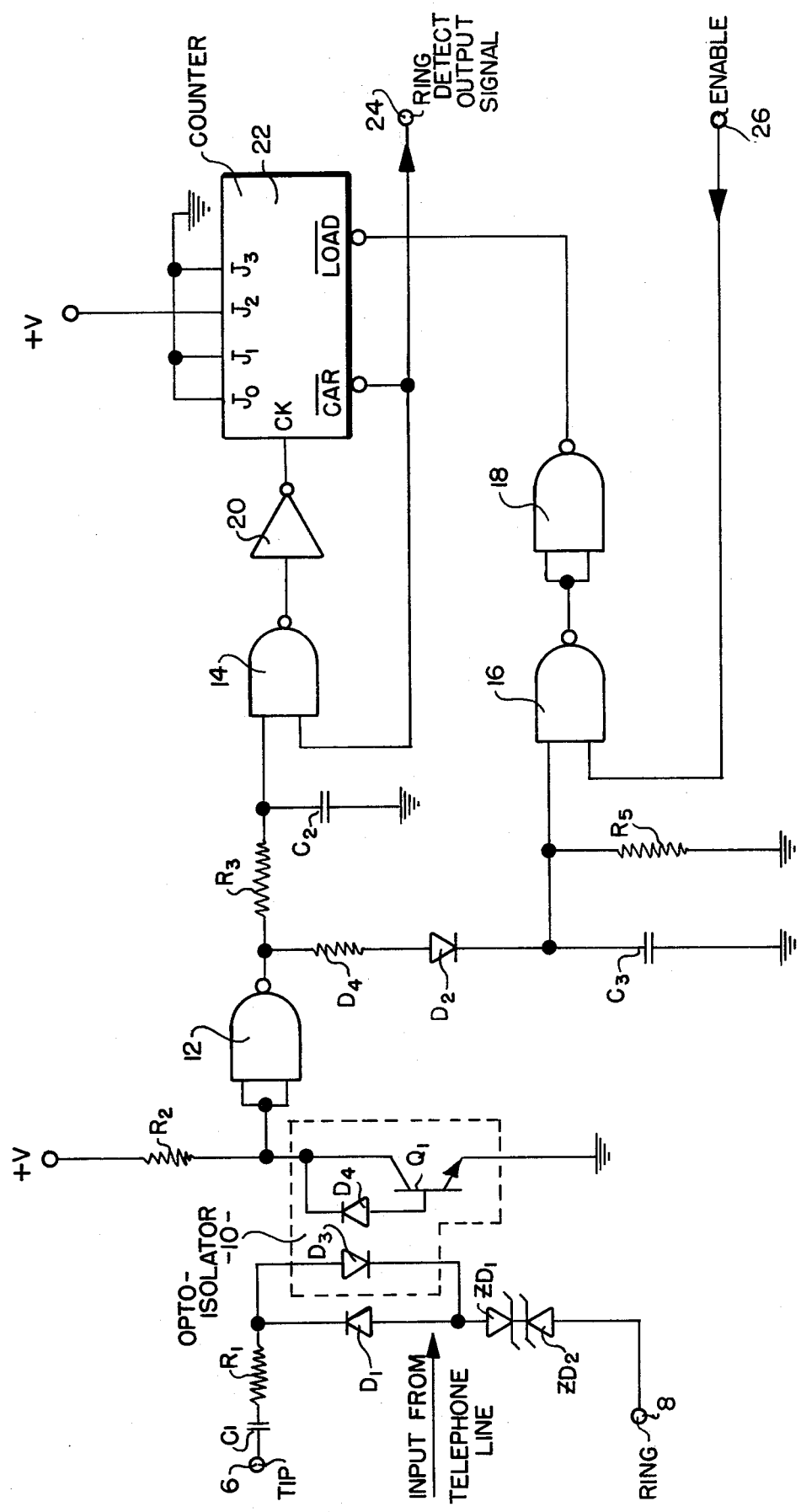

TELEPHONE RING DETECTOR CIRCUIT

BACKGROUND OF THE INVENTION

Telephone answering systems are available on the market which respond to ring signals received over the telephone line to become activated so that a recorded announcement may be transmitted over the telephone line to the calling party and so that a message from the calling party may subsequently be recorded.

However, problems have arisen in the past in making such telephone answering systems unresponsive to other signals on the telephone line, such as dialing pulses, or multi-frequency dialing tones. For example, if a person attempts to dial a telephone in the vicinity of an activated prior art telephone answering system, the answering system has a tendency to respond to the dialing pulses or tones generated during the telephone dialing operation, mistaking them for ring signals. This causes the answering system to come on to the telephone line and to break the outgoing dialing signals so that no outgoing calls can be completed.

The ring detector circuit of the present invention, accordingly, has utility in conjunction with telephone answering systems, and it will be described in such an environment. However, it will become evident as the description proceeds that the detector circuit of the invention is not limited to such a use, but finds utility in conjunction with a number of systems in which incoming signals are to be distinguished, and only one type of incoming signal is to be recognized and detected.

Distinguishing between ringing signals and dial pulse signals on the telephone line has presented a problem in the prior art telephone answering systems, because the bursts of ringing signal and the trains of dial pulses closely resemble one another when detected at a bridged point on the telephone line.

For example, the telephone ringing signal is typically a high voltage wave, which may be either square or sinusoidal in shape, and which has an amplitude of approximately 40–100 volts RMS, or approximately 113–282 volts peak-to-peak; and of a frequency which may range from 16 Hz to 67 Hz.

Dial pulse signals, on the other hand, typically have a waveform which is relatively square in shape with a maximum amplitude of approximately 100 volts peak-to-peak, and of a frequency which may range from 8 Hz to 20 Hz.

It is, therefore, impossible to distinguish between the ringing signals and the dialing signals on the basis of frequency or wave shape, since both these parameters may be the same in some instances. It is also difficult to differentiate between the ringing and dialing signals on the basis of voltage amplitude since there is usually only a 13% differential therebetween, and this differential is far too critical to permit reliable differentiation between the two signals on an amplitude basis.

The detector circuit of the present invention distinguishes between the ringing signals and the dialing signals by counting the number of pulses or cycles of each burst of ringing signal, and by counting the number of pulses in each train of dialing signal. The detector circuit produces an output only when the number of cycles in a particular burst of ringing signal indicate that the signal is actually a ringing signal and not a dialing signal.

The number of pulses in each train transmitted over the telephone line during a dialing operation is very closely controlled, because the number of pulses in a particular train is a function of the digit dialled. For example, the largest digit dialled (0) is represented by a train of 10 pulses. The time between the dialing of successive digits is typically about 600 milliseconds. Therefore, the most severe condition presented to the telephone line during the dialing operation, insofar as distinguishing the dialing signal from the ringing signal is concerned, is the transmission of a series of ten pulses during the dialing operation, followed by an interruption of 600 milliseconds, followed by a second series of 10 pulses, followed by another 600 millisecond interruption, followed by yet another train of 10 pulses, this being repeated as often as the digit (0) is dialled.

A typical ringing signal transmitted over the telephone line, on the other hand, comprises bursts of the ringing signal of 1–3 seconds duration, and interrupted by time intervals of 2–5 seconds. In the most severe case, insofar as distinguishing the ringing signal from the dailing signal is concerned, a burst of ringing signal will have a minimum of 16 cycles, representing the 16 Hz minimum frequency, and will have a 1 second minimum duration.

The system of the present invention is predicated on the concept of counting the number of pulses transmitted over the telephone line during each signalling operation to differentiate between the ring signals and the dialing signals. In the circuit of one embodiment of the invention, a counter is enabled at the beginning of each train of dialing pulses and at the beginning of each burst of ringing signal. The counter then counts the number of pulses or cycles transmitted over the telephone line during each dialing or ringing signal operation. If an interruption of greater than 400 milliseconds between successive trains or bursts of a received signal is encountered, the counter resets and begins counting again when the next train of pulses or burst of signal appears on the telephone line. Only when the counter reaches a count of 12, or greater, does the circuit of the invention produce a ring-detect output.

Thus in the presence of a dialing signal the counter counts the first train of pulses corresponding to the first digit dialed (maximum of 10), and resets during the interruption (600 milliseconds) between the first digit dialled and the second digit dialled, counts the number of pulses in the second train corresponding to the second digit dialled (maximum of 10), and so on. At no time during the reception by the detector circuit of the dailing signal does the counter reach the count of 12, which is necessary for the circuit to produce a ring detect output signal. Therefore, the circuit is unresponsive to the dialing signal.

When the ring signal is transmitted, the counter of the detector circuit of the invention responds to the first ring signal bursts and counts the cycles thereof (a minimum of 16), resets in the interval between the first and second burst, counts the cycles of the second burst (a minimum of 16, and so on. For each counting operation, the counter exceeds the count of 12, and a ring detect output signal is produced indicating that a ring signal has been detected.

BRIEF DESCRIPTION OF THE DRAWING

The single FIG. is a circuit diagram of a presently preferred embodiment of the ring detector circuit of the invention.

DETAILED DESCRIPTION OF THE ILLUSTRATED EMBODIMENT

The circuit shown in the drawing includes a pair of input terminals 6 and 8 which are connected to the tip and ring contacts of a telephone line in known manner. Input terminal 6 is connected to a 0.5 microfarad capacitor C1 which, in turn, is connected through a 10 kilo-ohm resistor R1 to a light emitting diode D3. The light emitting diode is part of an opto-isolator 10 which may be of the type presently designated 4N25.

Light emitting diode D3 is shunted by a diode D1. Input terminal 8 is connected to the anode of diode D1 through a pair of Zener diodes ZD2 and ZD1. Also included in opto-isolator 10 is a transistor Q1 whose emitter is grounded, and whose collector is connected through a 100 kilo-ohm resistor R2 to the positive terminal +V of a direct current source, the negative terminal of which is grounded. A photodiode D4 is connected between the collector and base of transistor Q1.

The collector of transistor Q1 in opto-isolator 10 is connected to a Schmitt trigger 12 which may be of the type designated CR4093. The output of Schmitt trigger 12 is connected through a 100 kilo-ohm resistor R3 to the input of a second Schmitt trigger 14 which may be of the same type. A capacitor C2 is connected between the input of Schmitt trigger 14 and ground. Output of Schmitt trigger 14 is connected through an inverter 20, which may be of the type designated CD4069, to the clock input of a counter 22. Jam input pins $J_0$, $J_1$ and $J_3$ of counter 22 are grounded, and jam input pin $J_2$ is connected to the positive terminal +V. The carry output $\overline{CAR}$ of the counter is connected back to the input of Schmitt trigger 14 to enable the Schmitt trigger. An output terminal 24 is also connected to the carry terminal $\overline{CAR}$ of counter 22, and the ring output signal appears at output terminal 24.

The output terminal of Schmitt trigger 12 is also connected through a 1 kilo-ohm resistor R4 and through a diode D2 to the input of a further Schmitt trigger 16 which, likewise, may be of the type designated CD4093. Diode D2 is also connected to a grounded 3.9 meg-ohm resistor R5 which is shunted by a 0.1 microfarad capacitor C3. Schmitt trigger 16 is enabled by an appropriate enable signal from the telephone answering system which is introduced by way of terminal 26. The output of Schmitt trigger 16 is connected to a further Schmitt trigger 18 which also may be of the type designated CD4093. The output of Schmitt trigger 18 is connected to the jamming load input ($\overline{LOAD}$) of counter 22.

The tip and ring input terminals 6 and 8 are connected to the telephone line through a usual coupling circuit. Capacitor C1 provides direct current isolation to maintain a normal on-hook condition for the circuit. Resistor R1 provides high impedance to ringing signals received from the telephone line. Zener diodes ZD1 and ZD2 provide high impedance to normal audio signals or to the tone signals produced by multi-frequency dual tone dialing. Diode D1 provides reverse protection for the light emitting diode D3 of opto-isolator 10.

In the stand-by condition of the circuit, no current flows through the light emitting diode D3. In this condition the collector of transistor Q1 in the opto-isolator is high, and the output of Schmitt trigger 12 is low, so that capacitor C3 is discharged. This causes the output of Schmitt trigger 14 to be high, and the output of Schmitt trigger 18 to be low which enables the jamming load input of counter 22.

The jamming load input of counter 22 is asynchronous, and whenever this input is enabled (low) it causes the output of the counter to correspond with the jam inputs $J_0$–$J_3$, regardless of clocking conditions. The jam inputs are wired to provide a binary 4. Therefore, any time the jamming load input is low, the counter output will equal binary 4.

During each pulse of a dialed digit, and during each cycle of a burst of ringing signal received by the detect circuit shown in the drawing, the light emitting diode D3 emits light to the photodiode D4. Therefore, each dialing pulse and each cycle of ringing signal causes the collector of transistor Q1 in the opto-isolator 10 to go low. The resulting pulse is squared in Schmitt trigger 12 and becomes a high signal at the output of the Schmitt trigger. This high signal causes capacitor C3 to be charged in approximately 100 microseconds through resistor R4 and diode D2. Now, if the detect circuit is enabled by a suitable enable signal applied to terminal 26, the output of Schmitt trigger 16 will go low, causing the output of the second Schmitt trigger 18 to go high thereby removing the jam load from counter 22.

The counter is now free to begin counting from the initial count of binary 4. Capacitor C3 discharges through resistor R5. The time constant is approximately 400 milliseconds so that the inhibit load condition at the output of Schmitt trigger 18 is restored before the next dialing pulse or ringing signal cycle is received. Each ensuing pulse of the received dialing signal, or each ensuing cycle of the received burst of ringing signal, again produces the high condition at the output of Schmitt trigger 18.

Resistor R3 and capacitor C2 at the input to Schmitt trigger 14 integrate over 10 milliseconds to remove any high frequency signals due to contact bounce, and to remove other spurious signals. The carry output ($\overline{CAR}$) of counter 22 is high until the terminal count of 16 is reached by the counter. This allows the output of Schmitt trigger 14 to follow the integrated pulses of the ringing or dialing signals appearing across capacitor C2. These pulses appear inverted at the output of Schmitt trigger 14 and they are again inverted by inverter 20 and fed to the clock input (CK) of counter 22. Therefore, after the jam input load ($\overline{LOAD}$) has been removed, each dialing or ringing pulse will increment the counter by one count.

Should the counter 22 reach its terminal count of 16, which is only possible when a burst of ringing signal is received, the carry out ($\overline{CAR}$) will go low. This output is applied to output terminal 24 as the ring detect signal. Since the difference between the initial count of the counter (binary 4) and the terminal count (binary 16) is 12 counts, the dialing pulses which have a maximum of 10 can never cause the counter to reach its terminal count. However, each burst of ringing signal, which has a minimum of 16 cycles, will invariably cause the counter to reach its terminal count, thereby producing the ring detect signal at output terminal 24.

The carry output ($\overline{CAR}$) of counter 22 is also introduced to the Schmitt trigger 14 to disable the Schmitt trigger when the counter reaches its terminal count. This prevents any further pulses from reaching the clock input (CK) of the counter, so that the counter remains in its terminal condition, until the load jamming input ($\overline{LOAD}$) is returned to a low condition at the end of the received burst of ringing signal which established the counter in its terminal count condition.

The circuit of the present invention, therefore, serves to detect the presence of a ringing signal on the telephone line, and is unresponsive to the dialing signal. To summerize the operation of the circuit of the invention, the worst case of dialing, 10 pulses followed by 600 milliseconds interruption, repeated for each digit) will go undetected. For this situation, at the beginning of each pulse train, capacitor C3 will be charged removing the jam input condition from the counter. The counter will then be incremented by 10 counts, from binary 4 to binary 14. This count, however, is not sufficient to create a carry (ring detect) output. During the inter-digital time of approximately 600 milliseconds, capacitor C3 will be discharged through resistor R5 causing the jam input of the counter 22 again to be activated, again reducing the initial count to binary 4. This process is then repeated for any digit which may be dialled using dial pulse signalling.

When ringing is present on the telephone line, the aforesaid process also takes place. However, due to the minimum number of cycles present in a burst of ringing signal, a carry output (ring detect) will be achieved by the counter. This ring detect output will begin on the twelfth cycle of the ringing signal burst, and will continue until 400 milliseconds after the termination of the burst of ringing signal. Since the minimum time between bursts of ringing signal is typically 2 seconds, capacitor C3 will safely discharge, enabling the jam input to reset counter 22 for detection of the next burst of ringing signal.

It will be appreciated that while a particular embodiment of the invention has been shown and described, modifications may be made. The following claims are intended to cover all such modifications which fall within the true spirit and scope of the invention.

What is claimed is:

1. A telephone ring detector system which is responsive to a ringing signal received over a telephone line in bursts individually having a predetermined minimum number of cycles and said bursts being separated by a first predetermined time interval, and which is unresponsive to dialing pulses received over the telephone line in trains individually having a predetermined maximum number of pulses less than said minimum number of cycles of each burst of the ringing signal and separated by a second predetermined time interval, said system comprising: a counter; first circuit means connected to said counter for introducing pulses to said counter so as to cause said counter to count from a reference count; input circuit means connected to the telephone line and to the first circuit means and responsive to the ring signal and dialing pulses thereon to cause said first circuit means to introduce pulses to said counter to cause said counter to count from said reference count; reset circuit means connected to said counter to reset said counter to said reference count during the first and second predetermined time intervals; and output terminal means connected to said counter at which an output signal is produced only when said counter achieves a predetermined count corresponding to said predetermined minimum number of cycles of each of said bursts of ringing signal.

2. The telephone ring detector system defined in claim 1, in which said reset circuit means is connected to said input circuit means and serves to hold said counter at said predetermined reference count so long as said reset circuit means is in a first operating condition, said reset circuit means being responsive to the initiation of each burst of said ring signal and to the initiation of each train of said dialing pulses received by said input circuit means to assume a second operating condition in which the counter is enabled.

3. The telephone ring detector system defined in claim 2, in which said reset circuit means includes a resistance-capacitance network for returning said reset circuit means to said first operating condition upon the termination of each burst of said ring signal and upon the termination of each train of said dialing pulses and after a predetermined time interval less than said first predetermined time interval and less than said second predetermined time interval.

4. The telephone ring detector system defined in claim 1, and which includes a resistance-capacitance network included in said first circuit means to render the counter unresponsive to high frequency spurious signals.

5. A detector system which is responsive to a first signal received in bursts individually having a predetermined minimum number of cycles and said bursts being separated by a first predetermined time interval, and which is unresponsive to a second signal received in bursts individually having a predetermined maximum number of cycles less than said minimum number of cycles of each burst of said first signal and separated by a second predetermined time interval, said system comprising: a counter; first circuit means connected to said counter for introducing pulses to said counter so as to cause said counter to count from a reference count; input circuit means connected to said first circuit means and responsive to the first and second signals to cause said first circuit means to introduce pulses to said counter to cause said counter to count from said reference count; reset circuit means connected to said counter to reset said counter to said reference count during the first and second predetermined time intervals; and output terminal means connected to said counter at which an output signal is produced only when said counter achieves a predetermined count corresponding to said predetermined minimum number of cycles of each of said bursts of said first signal.

6. The detector system defined in claim 5, in which said reset circuit means is connected to said input circuit means and serves to hold said counter at said predetermined reference count so long as said reset circuit means is in a first operating condition, said reset circuit means being responsive to the initiation of each burst of said first signal and to the initiation of each burst of said second signal received by said input circuit means to assume a second operating condition in which the counter is enabled.

7. The detector system defined in claim 6, in which said reset circuit means includes a resistance-capacitance network for returning said reset circuit means to said first operating condition upon the termination of each burst of said first signal and upon the termination of each burst of said second signal and after a predetermined time interval less than said first predetermined time interval and less than said second predetermined time interval.

* * * * *